United States Patent

Oswald

[15] 3,678,189
[45] July 18, 1972

[54] METHOD OF PRODUCING TIME-POSITION RECORDS OF OBJECTS

[72] Inventor: Robert A. Oswald, P.O. Box 458, Gardnerville, Nev. 89410

[22] Filed: Dec. 11, 1969

[21] Appl. No.: 884,091

[52] U.S. Cl. .................178/6.7 R, 178/DIG. 1, 178/7.7, 346/107 B
[51] Int. Cl. .................H04n 3/34, H04n 5/86, H04n 7/10
[58] Field of Search .................178/6.6 A, 7.6, 7.6 X, 6.7, 178/6.7 A, DIG. 1, 7.7; 346/107 B

[56] References Cited

UNITED STATES PATENTS

| | | | |
|---|---|---|---|
| 3,294,903 | 12/1966 | Goldmark | 178/7.6 X |
| 3,161,544 | 12/1964 | Berry | 346/74 MP |
| 3,277,493 | 10/1966 | Fyler | 346/74 EB |
| 3,217,098 | 11/1965 | Oswald | 178/DIG. 1 |
| 2,943,141 | 6/1960 | Knight | 178/6.6 A |
| 2,269,862 | 1/1942 | Rose | 178/DIG. 1 |
| 2,482,621 | 9/1949 | Jones | 346/107 B |

Primary Examiner—Howard W. Britton
Attorney—Townsend and Townsend

[57] ABSTRACT

A time-position record of objects moving with respect to a reference line obtained by scanning those portions of the objects passing past the reference line with an electron beam to form output signals which are transmitted to a recording station. A recording medium is transported past the station at a speed proportional to the relative speeds between the object and the reference line. The output signals are converted into recordable signals which scan over the recording medium in a plane substantially perpendicular to the direction of movement of the recording medium to thereby form a record of the object as the object passes the reference line.

2 Claims, 4 Drawing Figures

Patented July 18, 1972                                3,678,189
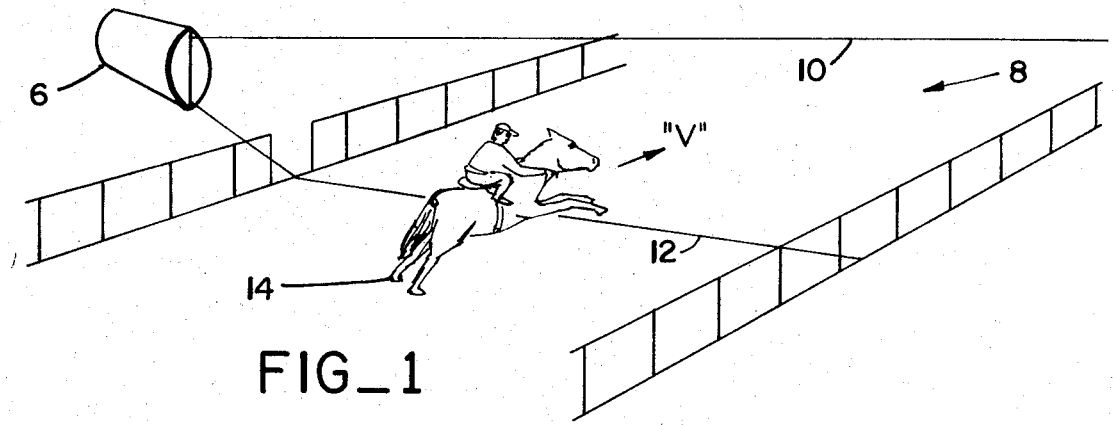
FIG_1
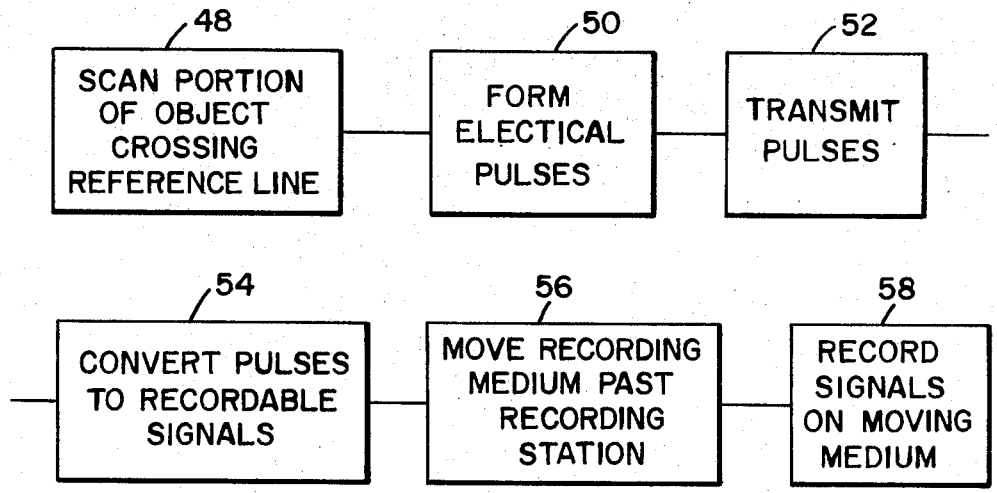
FIG_2
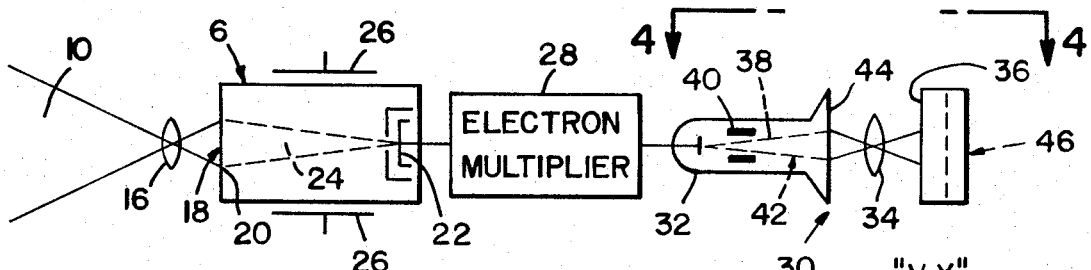
FIG_3
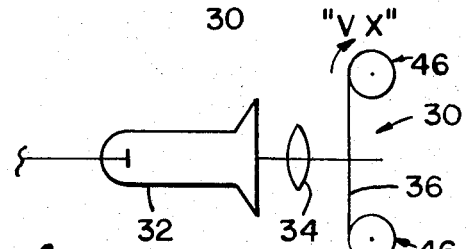
FIG_4
INVENTOR.
ROBERT A. OSWALD
BY
Townsend and Townsend
ATTORNEYS

METHOD OF PRODUCING TIME-POSITION RECORDS OF OBJECTS

BACKGROUND OF THE INVENTION

The determination of winners in races, say a horse race, is critical and difficult since the racers frequently cross the finish line almost simultaneously. It is a common practice to determine the real winner by photographs taken at the finish line at the moment the racers cross the line.

It is also known to take a time-position photograph of the finish. Such photographs provide a record of the relative positions of the race participants as they cross the finish line. On the photograph the participants are spaced apart a distance proportional to the time differences with which they cross the finish line.

In the prior art such relative position indicating pictures were produced by aligning a camera with the finish line to project an image of the finish line onto a film. The projected image is blocked out except for a narrow slit that is in exact alignment with the finish line. The film is continuously transported past the slit at the speed with which the projected image of the racer moves and, therefore at a speed proportional to the speed at which the race participants cross the finish line.

Such prior art time-position pictures, though very useful, have several drawbacks. Physically the camera and film transport mechanism must be installed at the finish line. The exposed picture is developed at the site and then made available to viewers. Users of the picture, however, are usually not located at the camera site so that the picture must be transported to where it is needed, say the judges room, the betting control station, etc. This requires valuable time.

Distribution of the picture beyond the immediate premises surrounding the finish line requires either physical transport of the picture, which is slow and time consuming, or necessitates transmittal of the picture by such means as television, picture telegraphy, and the like. This is again time consuming and requires expensive additional equipment.

In addition to the above shortcomings prior art time-position picture taking methods are generally limited to the use of photographic film. The many other media now available on which permanent records can be formed cannot be employed with available equipment.

SUMMARY OF THE INVENTION

The present invention provides a method for pictorially or otherwise recording objects as they pass a relatively fixed reference line at a known speed. Briefly, the method comprises the steps of forming an image of the portion of the object passing the line, scanning a beam over the portion to obtain first signals defined by the portion and converting the first signal into electrical pulses. The pulses are transmitted to a recording station and converted into second signals scanning in a plane and recordable on a recording medium. The recording medium is transported past the recording station at a speed proportional to the relative speed between the reference and the objects and in a direction transverse to the scanning plane of the second signals on the medium. A record of the object as the medium passes the scanning plane is thereby formed.

In the preferred form of the invention the first three steps of the method are performed by a modified vidicon television camera in which an image of the race track finish line is scanned by an electron beam oscillating in the plane of the finish line. The amplified output signal is then transmitted to the recording station which can be positioned at any desired location irrespective of its distance from the television camera.

At the recording station a visible record of the object can be formed as it is scanned at the finish line or the object can be recorded on magnetic tape. Virtually any desired recording medium, such as photographic film and/or paper, electrostatically charged paper, and the like can be employed on the basis of whichever is most convenient and/or economical. In terms of hardware for the recording station, any one of the large number of devices, such as cathode ray tubes, laser beams, magnetic recording heads, etc., can be employed.

The camera is installed at the finish line while one or several recording stations are placed at the needed locations. By employing high-speed, virtually instantaneous and continuously operating developing techniques the production of the completed record or picture can be completed within seconds after the event. The picture can then be available for virtually instantaneous use by viewers located many miles from the finish line.

The transmission of the television camera output signals to the recording station is preferably via a closed circuit if the distances are not great. For long distance transmission, between cities, for example, the television camera output signals can be broadcast to a receiving station for transmission to the recording station.

The last aspect of the invention enables its use for any application where a still picture of a relatively moving object is to be taken. One such application is aerial surveillance, particularly surveillance where ground stations require the instantaneous use of the surveillance results. Thus, in certain military applications, as where target areas are overflown, the output signals from the television camera can be broadcast to a ground receiving station for an almost instantaneous pictorial readout of the overflown area.

An important aspect of the present invention is the high resolution readout. Conventional television photography which exhibits relatively low resolution since the scan lines are spaced over a large area limits the extent to which such pictures can be enlarged. In contrast thereto, the present invention only scans a single line, permitting a much closer spacing of the scan lines and thereby resulting in a much higher resolution of the readout.

BRIEF DESCRIPTION OF THE DRAWINGS

FIG. 1 is a fragmentary, prospective schematic view of a race track finish line;

FIG. 2 is a schematic flow diagram depicting the various steps of the present invention;

FIG. 3 is a schematic diagram illustrating a time-position record producing apparatus constructed according to the present invention; and FIG. 4 is a fragmentary view and is taken on line 4—4 of FIG. 3.

Referring first to FIG. 1, a schematically illustrated television camera 6 is positioned adjacent a side of a race track 8. The television camera scans a single, vertical plane 10 which is in exact alignment with a finish line 12 being crossed by a race horse 14. The horse moves across the finish line with a speed $v$ that is known in advance within narrow limits.

Referring to FIG. 3, television camera 6 scanning the track finish line preferably is a vidicon camera having a lens 16 projecting an image 18 of plane 10 (illustrated in FIG. 1) on a screen 20 of the camera. An electron beam originates at a cathode 22 of the camera, is directed towards screen 20 and deflection coils 26 oscillate the beam in a plane 24. Plane 24 is in exact optical alignment with plane 10 (shown in FIG. 1). It will be clear that the optical alignment between the two planes does not require their physical alignment, such optical alignment can also be obtained through the use of mirrors, reflecting prisms and the like installed so that a physical alignment of the camera with the finish line is not required.

Operation of the vidicon camera is conventional except that the deflection coils limit the electron beam to oscillating in plane 24 only instead of scanning the beam over the full area of screen 20 on which the lens projects the image. As a result the electron beam scans a single line of the projected image, the line which is aligned with the race track finish line.

In a conventional manner the electron beam intensity is amplified in an electron multiplier 28 to form electrical pulses for transmission to a recording station 30. As is well known the amplitude of the electron beam current varies in accordance with the variations of the light intensity of that portion of the projected image 18 aligned with plane 24, and therefore scanned by the electron beam. Consequently, the electron beam provides signals for the reproduction of the scanned portion of the image at the recording station.

Generally speaking, at the recording station a recording or second signal is formed from the electron multiplier output pulses. The second signals, say in the form of another electron beam, correspond to the signals obtained in the television camera and such signals are projected or otherwise brought in contact with a recording medium that moves past the station and records the signals on the medium.

Referring to FIGS. 3 and 4, in one embodiment of the invention recording station 30 is defined by a cathode ray tube (CRT) 32 and a lens 34. The CRT transforming the incoming pulses into an electron beam 38 and deflection coils 40 oscillate the beam in a vertical plane 42. The electron beam striking screen 44 causes light dots or sogma;s and lens 34 projects the light signals onto a light sensitive medium such as photographic film or paper 36 by lens 34. It will be noted that the projection of the light dots occuring on the tube screen remains in a plane aligned with the electron beam oscillating plane 42. Plane 42 in which the CRT electron beam oscillates is the reproduction of the race track finish line plane 10 (illustrated in FIG. 1) in which the electron beam of television camera 6 oscillates.

Drive means 46 is provided to continuously advance photographic film 36 past recording station 30 and more particularly past the projection of the light flashes occurring on screen 44 of CRT 32. The drive means is selected to advance the film at a rate which equals the known speed $v$ of the racer passing finish line 12 (see FIG. 1) times an adjustment factor $x$ so that the speed of the racer image projected onto photographic film 36, equals the film speed. In this manner the successive passage of portions of the racer past the finish line is successively recorded on the photographic paper and leaves thereon a high resolution, sharp image of the racer.

As distinguished from ordinary photography the sharp picture obtained at the recording station is not an "instantaneous" picture as obtained by ordinary photography but a "time-position" picture in which those portions of a relatively moving object are recorded that are at a predetermined relative location at any instant of time. The recordation of the whole object, therefore, requires an exposure time which is solely determined by the relative speed and size of the object.

If the television camera 6 records two or more objects, as during a race with a plurality of participants which cross the finish line successively the first appearance on the readout at recording station 30 of each racer occurs at the instant he begins to cross the finish line. The winner of the race is therefore recorded first and thereafter the second, third, etc., finishers of the race.

The relative spacing on photographic film 36 of the racer images is a function of the time differential between their finishes. Since the film speed is known the time differential can be read off the film by measuring the distance between the first appearance of the racers on the film and dividing the measured distance by the film speed. A scale (not separately shown) can be directly imprinted and/or recorded on the photographic paper so that finish time differentials can be quickly and accurately determined.

Referring to FIGS. 1 and 3, in applications of the present invention for obtaining records of race finishes it is possible that one of the racers obscures another racer from being viewed by television camera 6 as he crosses finish line 12. To assure that the finish position of each racer is recorded the race track is provided with a mirror (not shown) positioned on the opposite side of the track from the television camera and which is also within the field of the camera so that a second, mirror image of the racers is obtained and recorded. That mirror image clearly shows those race participants which are obscured from direct view by the camera. The use of such mirrors is well known in the art and therefore not described or shown herein.

The actual on-site installation of the camera is preferably raised above the race track so that it is directed at the track at an oblique angle. If desired and physically possible the camera can also be installed directly overhead the race track finish line 12.

Referring to FIG. 2, and turning to the operation of the apparatus illustrated in FIGS. 3 and 4, television camera 6 is positioned at the race track finish line 12 as previously described. Drive means 46 for the photographic film are set so that the film is advanced past the recording station 30 at the above described speed $vx$. After the start of the race, and preferably just prior to the arrival of the first race participant at finish line 12, the apparatus is energized so that television camera 6 scans finish line plane 10. That step is identified in the flow diagram of FIG. 2 with reference numeral 48. The television camera together with electron multiplier 28 form (reference numeral 50) electrical pulses which are then transmitted (reference numeral 52) to the recording station.

At the recording station the incoming pulses are converted (reference numeral 54) to recordable signals, such as the above described light signals. The recording medium, such as photographic paper 36, is moved (reference numeral 56) past CRT 32 and the light signals appearing on the screen are projected onto the moving film to record the signals thereon. This last step is identified by reference numeral 58.

As long as no race participant crosses the finish line and the apparatus is in operation no readout is obtained at recording station 30. Any objects located within finish line scanning plane 10, such as race track turf or race track railings, merely leave impressions of various degrees of lightness or darkness which then form lines (not shown) parallel to the direction of movement of the photographic film. The instant the first race participant beings to cross the finish line portions of that participant as they cross the line are picked up by television camera 6 and result in light flashes on CRT screen 44. The intensity of the light signals is determined by the lightness or darkness of the portion of racer crossing the finish line. Subsequently, as each racer crosses the line he too is recorded on the film.

Thereafter the exposed film is developed in a conventional manner. Preferably, it is developed as rapidly as possible so that the photographic record of the finish is ready virtually immediately upon the completion of the race.

It will be clear that the readout obtained at the recording station is not limited to readout recorded on the photographic film or paper. When employing a cathode ray tube as the pulse converter any light sensitive medium using wet or dry developing methods can be employed. In addition, the signal converter can be a magnetic recording head in which case the photographic film moving past the recording station is replaced with magnetic tape. The pulse converter can also be a device subjecting a relatively moving medium such as paper to an electrostatic field to thereby electrostatically charge portion of the paper. Thereafter, a fluent material such as carbon powder is distributed over the paper to darken portions of the paper in accordance with the electrostatic charges. Other readout devices or methods can be substituted for those described above provided they enable the necessary relative motion between the signal converter and the recording medium.

As already described any desired number of recording stations can be connected to the television camera and set up at any desired location. In addition the outward pulses from the camera can be broadcast to a receiver coupled with the recording station so that the camera and/or the recording station can be placed in mobile units such as aircraft, land or sea vehicles, and the like.

Although several embodiments of the invention have been described, it will be clear that no other adaptations and modifications can be made without departing from the true spirit and scope of the invention.

I claim:

1. A method for obtaining a high resolution still record of the time relative position of objects passing a reference line comprising the steps of forming a stationary image substantially parallel to the direction in which the object moves across the reference line, the image including the reference line, scanning an electron beam in a single plane which is in alignment with the reference line over the image, forming one set of electrical pulses responsive to the electron beam intensity, transmitting the set of electrical pulses to a recording station, converting the set of pulses at the recording station into signals recordable on a preselected medium, scanning the signals in a plane, directing the signals towards the medium and moving the recording medium past the recording station at a speed proportional to the relative speed with which the objects pass the reference line so that the signals are sequentially recorded on the medium, whereby a still record of the object is obtained in which the spacing between the objects on the record is a function of the time difference with which the objects pass the reference line.

2. A method for substantially instantaneously obtaining a pictorial record of the relative finishing positions of participants in a race including a record of the time difference with which the participants finish, the method comprising the steps of positioning an image producing device in alignment with a finish line adjacent a path along which the participants move across the finish line so that the image includes the finish line, scanning an electron beam over the image in a single plane aligned with the finish line image, the electron beam being responsive to light intensity variations, amplifying the electron beam intensity to form a set of electrical pulses, transmitting the set of pulses to a recording station, moving a recording medium past the recording station at a speed which is substantially proportional to the speed with which the participants cross the finish line, converting the set of pulses into signals capable of recordation on the medium and responsive to the intensity of the electron beam, and scanning the signals in synchronism with the electron beam in a plane corresponding to the scanning plane of the electron beam over the moving medium whereby an image of the participants is sequentially formed as they cross the finish line and in which the distance of the participants' images on the medium is directly proportional to their time differences in crossing the finish line.

* * * * *